(12) United States Patent
Ma

(10) Patent No.: US 8,471,678 B2
(45) Date of Patent: Jun. 25, 2013

(54) ELECTRONIC DEVICE WITH CODING/DECODING SYSTEM

(75) Inventor: Xian-Wei Ma, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 705 days.

(21) Appl. No.: 12/760,559

(22) Filed: Apr. 15, 2010

(65) Prior Publication Data
US 2011/0181389 A1    Jul. 28, 2011

(30) Foreign Application Priority Data
Jan. 23, 2010  (CN) .......................... 2010 1 0300632

(51) Int. Cl.
*G05B 19/00*  (2006.01)
(52) U.S. Cl.
USPC ...... 340/5.54; 250/353; 340/12.22; 340/5.53; 340/5.73; 340/5.85; 345/156; 455/556.1
(58) Field of Classification Search
USPC ...................... 250/353; 340/12.22, 5.53, 5.54, 340/5.73, 5.85, 545.1; 345/156; 455/556.1
See application file for complete search history.

(56) References Cited

U.S. PATENT DOCUMENTS

| | | | | |
|---|---|---|---|---|
| 5,912,619 A * | 6/1999 | Vogt | ........................... | 340/545.1 |
| 6,107,938 A * | 8/2000 | Du et al. | ..................... | 340/12.22 |
| 6,720,860 B1 * | 4/2004 | Narayanaswami | .......... | 340/5.54 |
| 6,903,720 B1 * | 6/2005 | Glithero | ........................ | 345/156 |
| 7,375,612 B2 * | 5/2008 | Murray et al. | ............... | 340/5.54 |
| 7,511,602 B2 * | 3/2009 | Huntzicker | .................. | 340/5.54 |
| 7,741,952 B2 * | 6/2010 | Denison et al. | .............. | 340/5.73 |
| 2006/0255907 A1 * | 11/2006 | Min | .............................. | 340/5.53 |
| 2007/0096025 A1 * | 5/2007 | Jenkins | ......................... | 250/353 |
| 2009/0280862 A1 * | 11/2009 | Loughlin et al. | ............ | 455/556.1 |
| 2010/0328036 A1 * | 12/2010 | Wang | ............................ | 340/5.85 |
| 2011/0156866 A1 * | 6/2011 | Denison et al. | .............. | 340/5.54 |
| 2012/0126941 A1 * | 5/2012 | Coggill | ........................ | 340/5.54 |

* cited by examiner

*Primary Examiner* — Daniel Wu
*Assistant Examiner* — Israel Daramola
(74) *Attorney, Agent, or Firm* — Altis Law Group, Inc.

(57) ABSTRACT

An electronic device includes an input unit, a processing unit and a coding/decoding system. The coding/decoding system includes a reflector array, a knob group, an infrared emission unit, an infrared receiving unit and a coding/decoding unit. The reflector array includes at least one mirror mounted rotatably in the electronic device. The knob group is configured for adjusting angles of the reflector array. The infrared receiving unit is configured for receiving infrared rays reflected by the reflector array and generating a password signal according to the received infrared rays. The coding/decoding unit is configured for receiving the password signal and converting the password signal into a password. The coding/decoding unit stores the password and locks the electronic device according to the password. To unlock the electronic device, the coding/decoding unit compares the password with a pre-stored password to determine whether to unlock the electronic device.

15 Claims, 3 Drawing Sheets

ELECTRONIC DEVICE WITH CODING/DECODING SYSTEM

BACKGROUND

1. Technical Field

The present disclosure relates to electronic devices and, particularly, to an electronic device with an coding/decoding system for locking/unlocking the electronic device.

2. Description of Related Art

A conventional password often includes alphanumeric characters, such as, 0-9, and a-z/A-Z. However, input devices used for inputting password information are substantially similar, and locations of the numbers and the characters arranged in the input device are almost uniform and common. Accordingly, passwords can easily be figured out merely by observing how they are input.

BRIEF DESCRIPTION OF THE DRAWINGS

The components of the drawings are not necessarily drawn to scale, the emphasis instead being placed upon clearly illustrating the principles of an electronic device with an coding/decoding system. Moreover, in the drawings, like reference numerals designate corresponding parts throughout several views.

DETAILED DESCRIPTION

Figure 1:
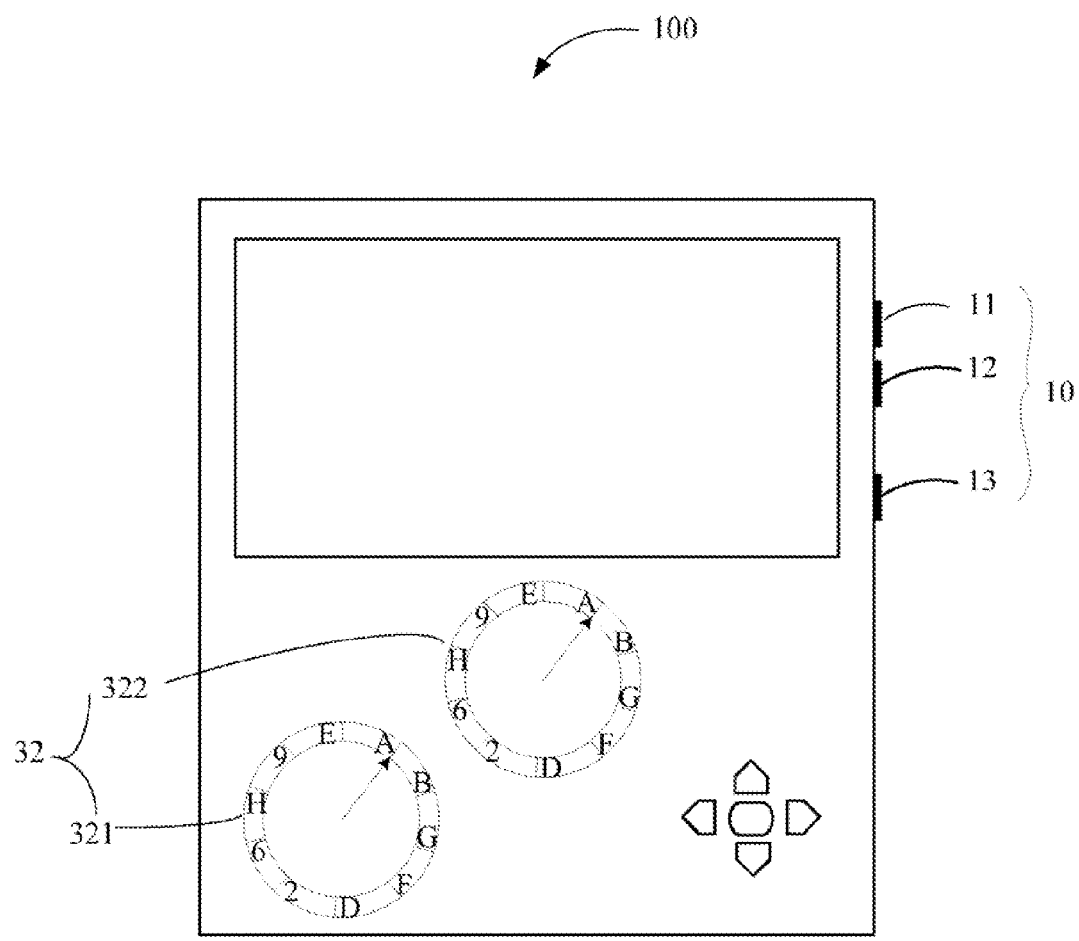
FIG. 1 is a front view of an electronic device in accordance with an exemplary embodiment.
Figure 2:
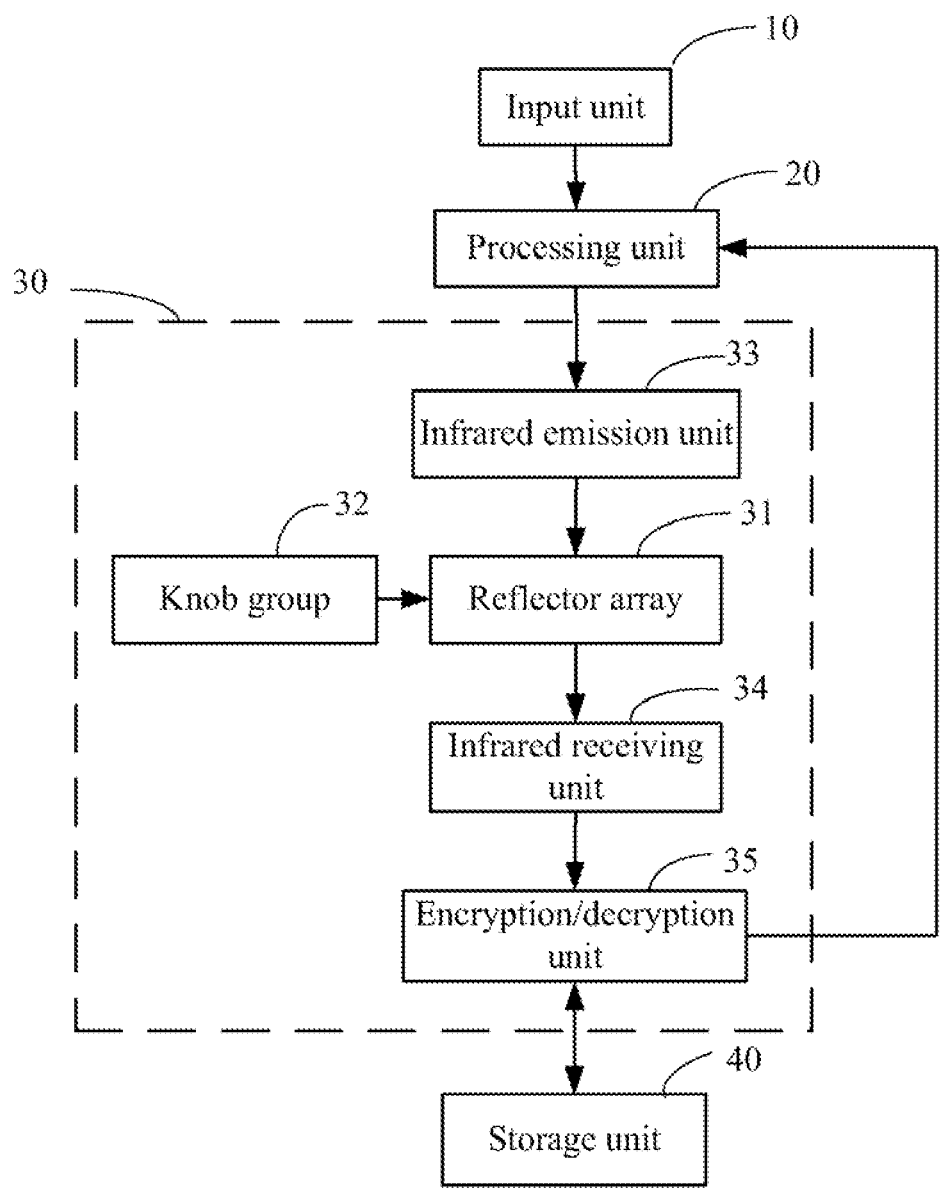
FIG. 2 is a block diagram of the electronic device of FIG. 1.

Referring to FIGS. 1-2, an electronic device 100 includes an input unit 10, a processing unit 20, an coding/decoding system 30, and a storage unit 40.

In the embodiment, the input unit 10 includes an coding button 11, a decoding button 12, and an infrared button 13. The coding button 11 is configured for generating an coding request. The decoding button 12 is configured for generating a decoding request. The infrared button 13 is configured for generating an infrared control signal for controlling the emission of the infrared rays of the coding/decoding system. In an alternative embodiment, the input unit 10 may only include a physical button. The processing unit 20 determines whether an coding request, a decoding request, or an infrared control signal is generated according to the length of time of the input signal of the physical button.

The processing unit 20 is configured for activating the coding/decoding system 30 according to the coding/decoding request, and further configured for controlling the emission of the infrared rays of the coding/decoding system 30 according to the infrared control signal.

Figure 3:
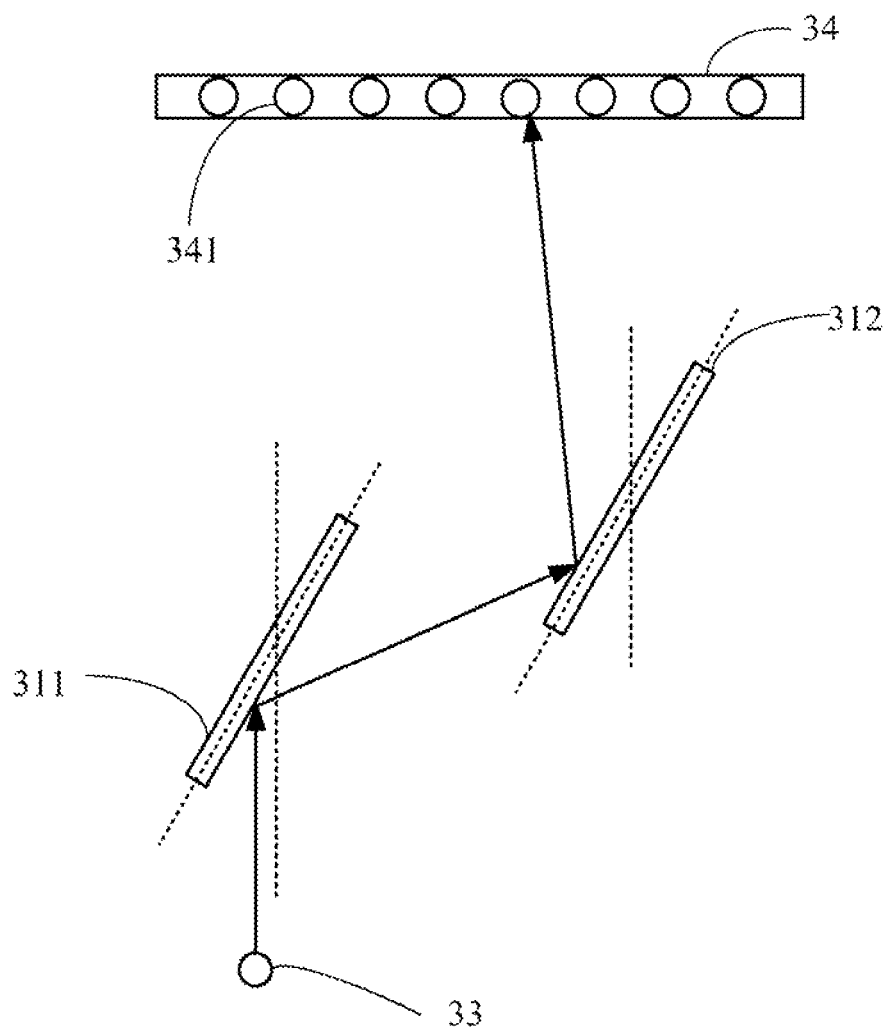
FIG. 3 is a schematic view of an coding/decoding system of the electronic device of FIG. 1, showing how the coding/decoding system is employed to encrypt/decrypt the electronic device.

Referring also to FIGS. 2-3, the coding/decoding system 30 includes a reflector array 31, a knob group 32, an infrared emission unit 33, an infrared receiving unit 34, and a coding/decoding unit 35.

The reflector array 31 includes at least one mirror rotatably mounted in the electronic device 100. In this embodiment, the reflector array 31 includes a first mirror 311 and a second mirror 312. The first mirror 311 and the second mirror 312 are spaced from each other, the reflection surface of the first mirror 311 faces the reflection surface of the second mirror 312, and the reflection surface of the first mirror 311 is closer to the infrared emission unit 33 than the second mirror 312. Therefore, the reflection surface of the first mirror 311 can reflect the infrared rays emitted by the infrared emission unit 33 to the second mirror 312, and the second mirror 312 reflects the infrared rays to the infrared receiving unit 34.

The knob group 32 mounted on the electronic device 100 is configured for adjusting rotation angles of the reflector array 31. The knob group 32 includes at least one knob. In this embodiment there are two knobs and each knob is configured to adjust rotation angles of one mirror of the reflector array 31. As shown in FIG. 1, each knob includes a pointer and a dial thereon. The dial includes different identifiers, for example numbers and/or characters formed thereon. Each of the identifiers of the dial corresponds to a rotation angle of the reflector array 31. In the embodiment, if one of the knobs is rotated to cause the pointer of the knob to point one of the identifiers on the dial, the reflector array 31 correspondingly rotates an angle corresponding to the selected identifier. In the embodiment, the knob group 32 includes a first knob 321 and a second knob 322. The first knob 321 is configured for adjusting rotation angles of the first mirror 311, and the second knob 322 is configured for adjusting rotation angles of the second mirror 312.

It should be noted that, in the embodiment, all possible positions of the first knob 321 and the second knob 322 correspond to positions at which the first mirror 311 can reflect the infrared rays emitted by the infrared emission unit 33 to the second mirror 312, and the second mirror 312 can reflect the infrared rays to the infrared receiving unit 34.

The infrared emission unit 33 is configured for emitting infrared rays to the reflector array 31. In the embodiment, the infrared rays emitted by the infrared emission unit 33 are firstly transmitted to the first mirror 311, and then the first mirror 311 reflects the infrared rays to the second mirror 312, and the second mirror 312 reflects the infrared rays to the infrared receiving unit 34.

The infrared receiving unit 34 is configured for receiving the infrared rays reflected by the reflector array 31 and generating a password signal according to the received infrared rays. In the embodiment, the infrared receiving unit 34 includes an array of infrared receivers 341. The adjacent infrared receivers 341 are spaced from each other. When an infrared receiver of the array of infrared receivers 341 receives the infrared rays, the infrared receiving unit 34 generates a password signal corresponding to the infrared receiver and transmits the password signal to the coding/decoding unit 35.

The coding/decoding unit 35 is configured for receiving the password signal and converting the password signal into a password according to a password table stored in the storage unit 40. In the password table, each password signal corresponds to a password. In the embodiment, the coding/decoding unit 35 can replace a pre-stored password with a newly formed password if password-resetting is intended.

In this embodiment, to lock the electronic device 100, the coding button 11 is pressed to transmit the coding request to the processing unit 20. The processing unit 20 then activates the coding/decoding system 30 according to the coding request. The first knob 121 is either rotated or left in place to cause the pointer to point to any one of the identifiers the user wants, and the second knob 122 is either rotated or left in place to cause the pointer to point to any one of the identifiers for that knob the user wants. Each combination of positions of the knobs 321, 322 cause the emitted infrared ray to follow a unique path and strike a particular receiver 341 so that a unique password can be generated. The infrared control button 13 is pressed to enter the combination, and the processing unit 20 controls the infrared emitting unit 31 to emit an infrared ray according to the infrared control signal, thus one of the infrared receivers 341 receives an infrared ray reflected by the reflector array 32 and generates a password signal corresponding to the infrared receiver 341. The coding/decoding unit 34 generates a password according to the received password signal and the password table. The coding/decoding unit 34 further stores the password in the storage unit 40 and locks the electronic device 100 according to the password as a pre-stored password.

To unlock the electronic device 100, the decryption button 12 is pressed to transmit the decoding request to the processing unit 40. The processing unit 40 then activates the coding/decoding system 30 according to the decoding request. The first knob 321 is rotated to cause the pointer to point to the certain identifier, and the second knob 322 is rotated to cause the pointer to point to the certain identifier. The infrared controlling button 13 is pressed, and the processing unit 20 controls the infrared emitting unit 31 to emit infrared rays according to the infrared control signal, thus a infrared receivers in the one of the infrared receivers 341 receives the infrared rays reflected by the reflector array 31 and generates a password signal corresponding to the infrared receiver 341. The coding/decoding unit 31 generates a password according to the received password signal and the password table. The coding/decoding unit 34 then compares the password with the pre-stored password. If the passwords match, the coding/decoding unit 34 unlocks the electronic device 100, otherwise, the electronic device 100 remains locked.

As described above, the user is granted access by rotating the knob group 32, thereby, protecting the password more safely and efficiently as it cannot be easily determined by mere observation since fixed patterns of input options are not being displayed.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device comprising:
    an coding/decoding system;
    an input unit configured for generating an coding request, a decoding request, and an infrared control signal; and
    a processing unit configured for activating the coding/decoding system according to the coding/decoding request, and further configured for controlling the emission of the infrared rays of the coding/decoding system according to the infrared control signal;
    the coding/decoding system comprising:
    a reflector array comprising at least one minor rotatably mounted in the electronic device;
    a knob group configured for adjusting rotation angles of the reflector array;
    an infrared emission unit configured for emitting infrared rays to the reflector array, wherein when the processing unit receives the infrared control signal, the processing unit controls the infrared emission unit to emit the infrared rays;
    an infrared receiving unit comprising an array of infrared receivers and configured for receiving the infrared rays reflected by the reflector array, wherein when one of the infrared receivers receives the infrared rays, the infrared receiving unit generates a password signal; and
    an coding/decoding unit configured for receiving the password signal transmitted from the infrared receiving unit and converting the password signal into a password according to a pre-stored password table, wherein in the password table, each password signal corresponds to a password; the coding/decoding unit stores the password as a pre-stored password, and to unlock the electronic device, the coding/decoding unit compares the password with the pre-stored password to determine whether to unlock the electronic device.

2. The electronic device as claimed in claim 1, wherein the input unit comprises an coding button, a decoding button, and an infrared button; the coding button is configured for generating the coding request, decryption button is configured for generating the decoding request, and the infrared button is configured for generating the infrared control signal.

3. The electronic device as claimed in claim 1, wherein the input unit comprises a physical button and the processing unit determines whether a coding request, a decoding request, or an infrared control signal is generated according to the length of time of an input signal of the input unit.

4. The electronic device as claimed in claim 1, wherein the knob group comprises at least one knob, and each knob is configured to adjust rotation angles of one mirror of the reflector array.

5. The electronic device as claimed in claim 1, further comprising a storage unit, wherein the storage unit is configured for storing the password table.

6. The electronic device as claimed in claim 1, wherein the adjacent infrared receivers are spaced from each other.

7. The electronic device as claimed in claim 4, wherein each knob of the knob group includes a pointer and a dial thereon, the dial comprises identifiers, and each of the identifiers corresponding to a rotation angle of the reflector array.

8. An electronic device comprising:
    a reflector array comprising at least one minor rotatably mounted in the electronic device;
    a knob group configured for adjusting rotation angles of the reflector array;
    an infrared emission unit configured for emitting the infrared ray to the reflector array;
    an infrared receiving unit comprising an array of infrared receivers and configured for receiving the infrared rays reflected by the reflector array, wherein when a infrared receiver of the array of infrared receivers receives the infrared rays, the infrared receiving unit generates a password signal corresponding to the infrared receiver; and
    an coding/decoding unit configured for receiving the password signal and generating a password corresponding to the password signal; wherein the coding/decoding unit compares a present password with a pre-stored password to determine whether to unlock the electronic device; and
    a processing unit configured for activating the infrared emission unit, and for controlling the emission of the infrared ray.

9. The electronic device as claimed in claim 8, further comprising an input unit, wherein the input unit comprises an coding button, a decoding button, and an infrared button; the coding button is configured for generating a coding request, decryption button is configured for generating a decoding request, and the infrared button is configured for generating an infrared control signal.

10. The electronic device as claimed in claim 8, further comprising an input unit, wherein the input unit comprises a physical button and the processing unit determines whether a coding request, a decoding request, or an infrared control signal is generated according to the length of time of an input signal of the input unit.

11. The electronic device as claimed in claim 8, wherein the knob group comprises at least one knob, and each knob is configured for adjusting rotation angles one mirror of the reflector array.

12. The electronic device as claimed in claim 8, further comprising a pre-stored password table, wherein in the password table, each password signal corresponds to a password.

13. The electronic device as claimed in claim 8, further comprising a storage unit, wherein the storage unit is configured for storing the password table.

14. The electronic device as claimed in claim 8, wherein the adjacent infrared receivers are spaced from each other.

15. The electronic device as claimed in claim 8, wherein each knob of the knob group includes a pointer and a dial thereon, the dial comprises identifiers, and each of the identifiers corresponding to a rotation angle of the reflector array.

* * * * *